J. S. Lewis,
Harrow.
No. 96,244.
Patented Oct. 26. 1869.
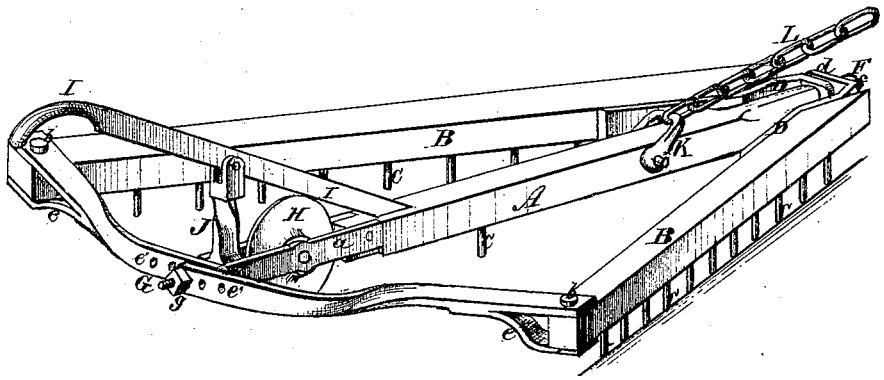
Witnesses
W. B. Deming
Fred'k M. Klauck
John S Lewis
by Knight Bros
Attorneys

JOHN S. LEWIS, OF ELKADER, IOWA.

Letters Patent No. 96,244, dated October 26, 1869.

IMPROVEMENT IN HARROWS.

The Schedule referred to in these Letters Patent and making part of the same.

I, JOHN S. LEWIS, of Elkader, in the county of Clayton, and State of Iowa, have invented certain new and useful Improvements in Harrows.

Nature and Objects of the Invention.

My improvements relate primarily to that class or description of harrows or drags known as side-hill harrows, in which the frame is divided longitudinally, and its two parts hinged together, so as to enable it to conform to irregularities in the surface of the ground, or to have either side turned up, to avoid obstructions.

The objects of my invention are to simplify the construction of, and increase the strength of the structure, to facilitate its guidance and control, and to improve its operation.

My improvements consist—

First, in the provision of a coulter, (rolling or stationary,) near the rear end of the centre-bar;

Second, the provision, in connection with such coulter, of a handle or handles, for guiding the harrow; and Third, in a novel and superior combination and arrangement of parts.

Description of Drawing.

The accompanying drawing represents a perspective view of a hill-side harrow, embodying my improvements.

General Description.

In said drawing—

A represents the centre bar or beam;
B B, the side bars;
C, the teeth;
D D E E, the links or braces, connecting the side bars B to the centre bar A;
F G, the pivotal pins in the ends of the centre bar A, for the attachment of the links D E thereto;
H, the coulter;
I, the guiding-handle;
J, a standard, for the support of the handle I;
K, the clevis; and
L, a chain, for attaching the draught to the clevis K.

The centre bar A may be made with a portion, $a$, of metal, for the support of the coulter H, or entirely of wood, and to enable a close joint with the side bars B, at the front end, it may be rounded off, as shown, or be of uniform form throughout.

The side bars B are preferably made entirely of wood, and rectangular in cross-section, as shown, their front ends being bevelled on the inner side as shown, to enable closer contact with the centre bar A, at that point.

The teeth C may be constructed and secured in place in any usual or suitable manner, being arranged entirely in the side bars B, or partially (one) in the centre bar A, as shown.

The links D E may be made of wrought-iron. The former are preferably attached rigidly to the front ends of the side bars B, being bent in conformity with the inner faces of said bars, having their outer ends $d$ at the proper angle, and perforated for the reception of the pivotal bolt F, in the front end of the centre bar A, as shown.

The latter, as also shown, are preferably connected with the side bars B, by vertical bolts $b$, being bifurcated, $e$, to receive the ends of said bars, and to engage with their attaching-bolts $b$, above and beneath them, being provided, at their outer extremities, with perforations $e'$, at right angles to the plane of said bolts $b$, for the reception of the pivotal pin G, in the rear end of the centre bar A.

The pins F G may be made of wrought-iron, and secured in any suitable manner. The former is preferably provided with a suitable head, $f$, and the latter screw-threaded on its outer end, and provided with a screw-nut, $g$, as shown.

The provision of the removable nut $g$, on the pin G, and the duplication of the perforations $e'$, of the links E, as shown, may enable the width of the rear end of the harrow to be adjusted, as desired, the vertical bolts $b$, and a slight elongation of the perforations in the ends $d$ of the front links D, serving to permit the requisite movement of the side bars B.

The coulter H may be either a rolling one, as shown, or stationary, and, in either case, may be mounted in any usual or suitable manner, at the rear end of the centre bar A.

The handle I may be of wood, and be supported by tenon and mortise, or other suitable connection, with the centre bar A, and by the standard J, which may be of either metal or wood, as shown.

Two handles may be employed, if preferred, and their support varied, as required. By employing but one, which is all that is requisite, the sides of the frame are adapted to be more readily supported in an elevated position, out of the way of obstructions.

The clevis K may be of cast or wrought-iron, of any suitable form, and attached in any proper manner, being arranged about one-third the length of the harrow, back from its front end, in the centre bar A, as shown.

The coulter H, projecting into the ground, serves to steady the movement of the harrow, and enable it to be accurately guided, its cutting characteristic enabling it to cut through roots, &c., which may lie in its path, and to more readily override such obstructions, as may not be thus disposed of. Its mark may be utilized for laying off the ground. Its position at the rear end prevents its interference with the ready turning of the harrow, serving, rather, to facilitate this.

Claim.

I claim, as new—

1. The coulter H, arranged and employed substantially as set forth.

2. In combination with the coulter H, the handle I, as and for the purpose described.

3. The combination, in a harrow, of a frame, A B B D E F G, teeth C, coulter H, handle I, and clevis K, constructed and arranged as herein represented and described, for the purposes set forth.

To the above specification of my improvements in harrows, I have signed my hand, this 29th day of June, A. D. 1869.

JOHN S. LEWIS.

Witnesses:
ELIJAH ODELL,
JAMES O. CROSBY.